June 7, 1960   M. E. FRY   2,939,731
CONTROL SHAFT
Filed Feb. 1, 1957   2 Sheets-Sheet 1

INVENTOR.
Millard E. Fry
BY Edwin S. Dybvig
His Attorney

June 7, 1960
M. E. FRY
2,939,731
CONTROL SHAFT
Filed Feb. 1, 1957
2 Sheets-Sheet 2
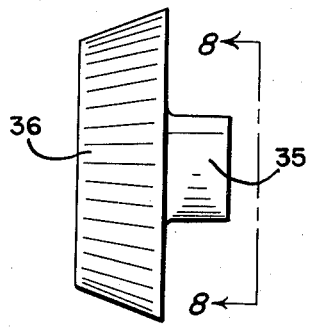
Fig. 7
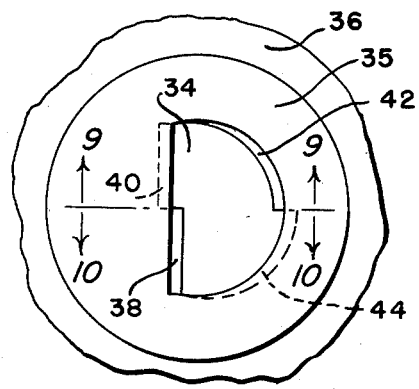
Fig. 8
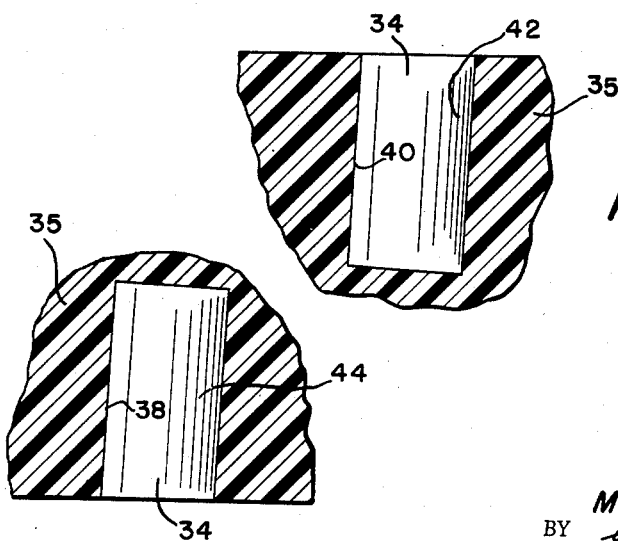
Fig. 9
Fig. 10
INVENTOR.
Millard E. Fry
BY Edwin L. Dybvig.
His Attorney `United States Patent Office`

2,939,731
Patented June 7, 1960

2,939,731

CONTROL SHAFT

Millard E. Fry, Dayton, Ohio, assignor to General Motors Corporation, Detroit, Mich., a corporation of Delaware Filed Feb. 1, 1957, Ser. No. 637,682

6 Claims. (Cl. 287—53)

This invention relates to an anti-back lash connection between a control shaft and a control knob, and to particular control shaft and control knob constructions for providing a tight anti-back lash connection.

The invention particularly relates to a control shaft of the type wherein the end portion of the shaft is divided into segmental or sector portions by a transverse slot and to means for connecting this type of shaft to a control knob.

An object of the invention is to spread the aforesaid segmental portions of a control shaft relative to one another in a direction normal to the transverse separating slot of the shaft and also in a direction parallel to the slot to provide a tight anti-back lash fit between the shaft and a control knob, when the end portion of the shaft is fitted within a shaft engaging aperture located in the control knob.

Another object of the invention is to provide a control knob with a shaft engaging aperture adapted to receive a control shaft of the type having segmental portions and where the control knob is provided with means for separating or spreading the segmental portions relative to one another when the segmental portions are inserted in the aperture.

Still another object of the invention is to provide a control knob with a shaft engaging aperture adapted to receive a control shaft having segmental portions separated by a transverse slot, and where the shaft engaging aperture has inclined walls for camming the segmental portions away from one another when the shaft is inserted within the aperture.

Further objects and advantages of the present invention will be apparent from the following description, reference being had to the accompanying drawings, wherein a preferred form of the present invention is clearly shown.

In the drawings:

Figure 7 is a side view of a control knob made in accordance with this invention;

Figure 8 is an enlarged view taken along line 8—8 of Figure 7;

Figure 9 is a sectional view taken along line 9—9 of Figure 8; and

Figure 10 is a sectional view taken along line 10—10 of Figure 8.

Figure 1:
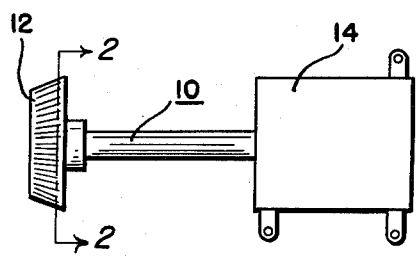
Figure 1 is a side view of a control shaft connected with an electrical control apparatus and with a control knob.

Referring now more particularly to Figure 1 a control shaft generally denoted by reference numeral 10 is connected with a control knob 12 formed of suitable plastic material, and with a suitable electrical control apparatus 14. The control apparatus may be a rheostat, a switch mechanism or any other suitable electrical control mechanism that is to be actuated by rotation of shaft 10. The control shaft 10 is rotated by manual rotation of control knob 12 which is connected thereto.

Figure 4:
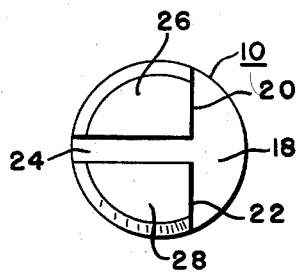
Figure 4 is an end view of Figure 3.
Figure 3:
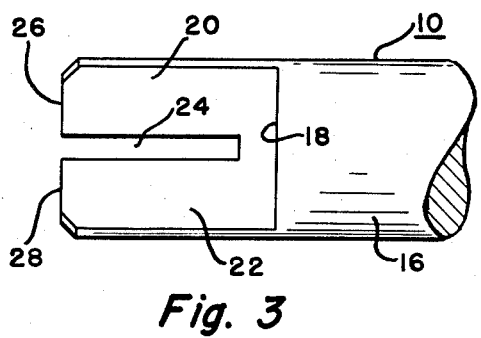
Figure 3 is an enlarged side view of the control shaft of this invention prior to the bending or separating of the segmental portions of the shaft.

The control shaft 10 prior to having its segmental portions separated or spread is shown in Figures 3 and 4 and includes a cylindrical shaft portion 16 that is cut away to form a flat surface 18 and flat surfaces 20 and 22. A transverse or substantially diametrically extending slot 24 is formed in the shaft and divides the end portion of the shaft into segmental or sector portions 26 and 28.

Figure 6:
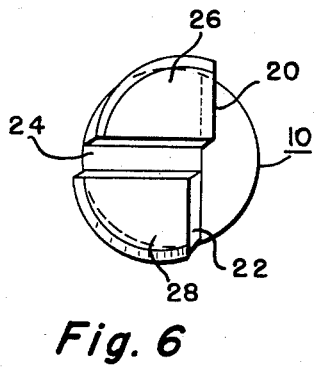
Figure 6 is an end view of Figure 5.
Figure 5:
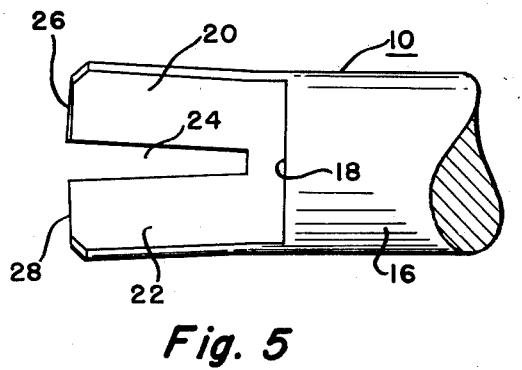
Figure 5 is an enlarged side view of a control shaft after the segmental portions of the shaft have been spread or separated relative to one another.

The segmental portions 26 and 28 of the shaft 10 shown in Figures 3 and 4 are separated or spread in order to provide a tight anti-back lash connection between the shaft 10 and the control knob 12 when the shaft is inserted within the shaft engaging aperture 30 formed in the control knob. To this end sector portions 26 and 28 are separated relative to one another along an axis that is normal to the axis of slot 24 as is clearly illustrated in Figures 5 and 6. The sector portions are also separated or spread relative to one another along an axis that is parallel to the axis of slot 24. This is clearly apparent from an inspection of Figures 5 and 6 wherein it can be seen that sector portion 26 is moved upwardly and rightwardly in Figure 6 while sector portion 28 is moved downwardly and leftwardly in Figure 6.

Figure 2:
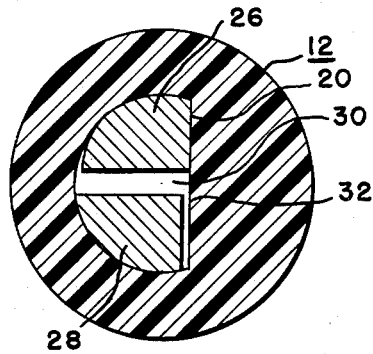
Figure 2 is an enlarged sectional view taken along line 2—2 of Figure 1.

When the segmental portions of the shaft are inserted within the shaft engaging aperture 30 a tight anti-back lash fit is provided between the shaft 10 and the control knob 12. The flat face 20 of sector portion 26 that has been spread rightwardly in Figure 6 tightly engages the flat wall 32 of shaft engaging aperture 30 as is clearly shown in Figure 2. The outer wall of sector portion 28 which has been shifted leftwardly in Figure 6 tightly engages the inner wall of shaft engaging aperture 30. With this two-fold spreading of the sector or segmental portions 26 and 28 a tight anti-back lash connection is provided between the shaft 10 and the control knob 12.

Figures 7, 8, 9 and 10 illustrate a modified arrangement for providing a tight anti-back lash connection between a control knob and a control shaft. In this arrangement the shaft engaging aperture 34 of the control knob is provided with inclined walls for spreading or separating the segmental portions 26 and 28 of control shaft 10. When the control shaft is inserted within the shaft engaging aperture the segmental portions are cammed away from one another. This knob may be used with the shaft shown in Figures 3 and 4 before the segmental portions have been separated or spread.

In the arrangement of Figures 7, 8, 9 and 10 are control shaft knob 36, having a reduced end portion 36, is provided with a shaft engaging aperture 34 that includes inclined walls 38, 40, 42 and 44. When the shaft of Figure 3 is inserted within the shaft engaging aperture 34 the wall 38 will cam one of the sector portions rightwardly in Figure 8 while the inclined wall 42 will cam the other sector portion leftwardly in Figure 8. It is thus apparent that an insertion of the control shaft shown in Figures 3 and 4 within the shaft engaging aperture 34 will bring about a separation or spreading of the sector portions 26 and 28 relative to one another along a line parallel to the transverse slot 24. This provides for a very tight anti-back lash connection between the control knob and the control shaft as the sector portions are shifted relative to one another to tightly engage the walls of the shaft engaging aperture 34. The control knob of Figures 7, 8, 9 and 10 is also adapted to receive a shaft of the type wherein the sector portions are separated along an axis normal to the axis of transverse slot 24 but wherein the sector portions are not shifted or separated relative to one another along a line parallel ot the axis of slot 24.

The arrangement shown in Figures 7, 8, 9 and 10 differs from the arrangement of Figures 1, 2, 3, 4 and 5 in that the knob 36 is so formed as to spread or separate the sector portions of the control shaft, whereas in Figures 1 through 5 the sector portions are spread before insertion into the control knob.

While the form of embodiment of the invention as herein disclosed constitutes a preferred form, it is to be understood that other forms might be adopted, as may come within the scope of the claims which follow.

What is claimed is as follows:

1. A generally cylindrical control shaft having a pair of segmental portions, at least one of said portions diverging outwardly away from the other of said portions along a transverse axis and at least one of said portions diverging away from the other of said portions at an angle to the longitudinal axis of said shaft along an axis normal to said transverse axis.

2. A cylindrical control shaft partially divided into a pair of segmental portions by a diametrically extending slot, said segmental portions diverging outwardly relative to one another along a transverse axis normal to the axis of said slot at an angle to the longitudinal axis of said shaft and diverging away from one another along an axis parallel to said slot.

3. A cylindrical control shaft partially divided into a pair of segmental portions by a transverse slot and each of said portions having a flat face located generally normal to said slot, said segmental portions diverging outwardly away from one another in a direction generally normal to said transverse slot at an angle to the longitudinal axis of said shaft and in a direction generally parallel to said transverse slot.

4. A generally cylindrical control shaft having a pair of segmental portions extending outwardly away from one another at an acute angle to the longitudinal axis of said shaft along a transverse axis, at least one of said segmental portions extending away from the other along an axis normal to said transverse axis and at an acute angle to the longitudinal axis of said shaft.

5. A cylindrical control shaft partially divided into a pair of segmental portions by a diametrically extending slot, said segmental portions extending outwardly relative to one another along a transverse axis generally normal to the axis of said slot at an angle to the longitudinal axis of said shaft and extending away from one another along an axis generally parallel to said slot.

6. In combination, a control knob having a shaft engaging aperture, a control shaft having an end portion fitted within said aperture, said end portion being divided into a pair of segmental portions by a transverse slot, said segmental portions extending at an angle to the longitudinal axis of said shaft along an axis generally normal to said transverse slot, said aperture having walls inclined relative to one another and spreading said segmental portions apart relative to one another along a line generally parallel to said transverse slot.

References Cited in the file of this patent
UNITED STATES PATENTS

| | | |
|---|---|---|
| 2,156,067 | Rubinstein | Apr. 25, 1939 |
| 2,283,905 | Beal | May 26, 1942 |
| 2,716,565 | Harper et al. | Aug. 30, 1955 |